United States Patent
Gu et al.

(10) Patent No.: US 11,882,037 B2
(45) Date of Patent: Jan. 23, 2024

(54) ENTRY PROCESSING METHOD, NETWORK DEVICE, AND CONTROL DEVICE

(71) Applicant: HUAWEI TECHNOLOGIES CO., LTD., Guangdong (CN)

(72) Inventors: Yunan Gu, Beijing (CN); Shunwan Zhuang, Beijing (CN); Zhenbin Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 189 days.

(21) Appl. No.: 17/245,633

(22) Filed: Apr. 30, 2021

(65) Prior Publication Data

US 2021/0250295 A1    Aug. 12, 2021

Related U.S. Application Data

(63) Continuation of application No. PCT/CN2019/115173, filed on Nov. 2, 2019.

(30) Foreign Application Priority Data

Nov. 2, 2018   (CN) .......................... 201811303757.2

(51) Int. Cl.
  *H04L 12/28*   (2006.01)
  *H04L 45/745*  (2022.01)
  *H04L 47/20*   (2022.01)

(52) U.S. Cl.
  CPC ............ *H04L 45/745* (2013.01); *H04L 47/20* (2013.01)

(58) Field of Classification Search
  CPC .............................. H04L 45/745; H04L 47/20
  See application file for complete search history.

(56) References Cited

U.S. PATENT DOCUMENTS 7,742,459 B2 * 6/2010 Kwan .................. H04L 45/245
                                                        370/351
8,937,961 B1 * 1/2015 Vairavakkalai ......... H04L 45/02
                                                        709/243

(Continued)

FOREIGN PATENT DOCUMENTS

CN      101741705 A    6/2010
CN      105721303 A    6/2016

(Continued)

OTHER PUBLICATIONS

A. Lindem et al, Rib Yang Data Model draft-acee-rtgwg-yang-rib-extend-08.txt, Network Working Group, Aug. 16, 2018, total 17 pages.

(Continued)

*Primary Examiner* — Chi H Pham
*Assistant Examiner* — Elisabeth Benoit Magloire
(74) *Attorney, Agent, or Firm* — WOMBLE BOND DICKINSON (US) LLP

(57) ABSTRACT

This application provides a route event record entry processing method, a network device, and a control device. The method includes: obtaining, by a network device, first information and second information that correspond to a route prefix, where the first information is used to indicate information about a first route policy for the route prefix, and the second information is used to indicate attribute information obtained after processing the route prefix by using the first route policy; and generating, by the network device, a route event record entry for the route prefix based on the first information and the second information, where the route event record entry includes the route prefix, the first information, and the second information.

27 Claims, 12 Drawing Sheets

(56) References Cited

U.S. PATENT DOCUMENTS

| | | |
|---|---|---|
| 9,106,530 B1 | 8/2015 | Wang |
| 10,432,503 B1* | 10/2019 | Rzehak .................. H04L 69/04 |
| 2009/0198832 A1* | 8/2009 | Shah ...................... H04L 43/10 |
| | | 709/239 |
| 2010/0150005 A1 | 6/2010 | Gerber et al. |
| 2010/0232435 A1* | 9/2010 | Jabr .................... H04L 12/4645 |
| | | 370/395.31 |
| 2012/0020364 A1* | 1/2012 | Zinjuwadia ......... H04L 63/0227 |
| | | 370/401 |
| 2012/0127997 A1 | 5/2012 | Zinjuwadia et al. |
| 2012/0218936 A1* | 8/2012 | Fleeman ................ H04L 45/04 |
| | | 370/316 |
| 2013/0103827 A1 | 4/2013 | Dunlap et al. |
| 2016/0149797 A1* | 5/2016 | Zhang .................... H04L 12/66 |
| | | 370/235 |
| 2016/0285761 A1* | 9/2016 | Dong .................. H04L 12/4666 |
| 2017/0195181 A1 | 7/2017 | Birmiwal et al. |
| 2018/0084012 A1 | 3/2018 | Joseph et al. |
| 2018/0351862 A1* | 12/2018 | Jeganathan ........... H04L 45/586 |

FOREIGN PATENT DOCUMENTS

| | | | |
|---|---|---|---|
| CN | 105847153 A | 8/2016 | |
| CN | 107770073 A | 3/2018 | |
| EP | 2928239 A1 | 10/2015 | |
| EP | 3496345 B1 * | 3/2021 | ......... H04L 12/4633 |
| WO | 2018000443 A1 | 1/2018 | |

OTHER PUBLICATIONS

Request for Comments: 7854, J. Scudder, Ed et al, BGP Monitoring Protocol (BMP), Internet Engineering Task Force (IETF), Jun. 2016, total 27 pages.

Request for Comments: 7454, J. Durand et al, BGP Operations and Security, Feb. 2015, total 26 pages.

Li Song et al, Study on BGP Security, Journal of Software, 2012, total 18 pages.

* cited by examiner

| Destination address | Index | Route event record | Timestamp | Next hop | Cost |
|---|---|---|---|---|---|
| 172.17.0.0/16 | 1 | ISIS: Route-policy r1 :permit/permit: cost 100 | xx:xx:xx | 192.168.2.2/24 | 100 |
| | 2 | RM: Route-policy r2 :permit/deny: next-hop | xx:xx:xx | ⇒ 192.168.1.1/24 | 100 |
| | 3 | RM: Route-policy r3 :permit/deny: cost 200 | xx:xx:xx | 192.168.1.1/24 | 100 |

FIG. 8

| Destination address | Index | Route event record | Timestamp | Next hop | Cost |
|---|---|---|---|---|---|
| 172.17.0.0/16 | 1 | ISIS: Route-policy r1 :permit/permit: cost 100 | xx:xx:xx | 192.168.2.2/24 | 100 |
| | 2 | RM: Route-policy r2 :permit/deny: next-hop | xx:xx:xx | 192.168.1.1/24 | 100 |
| | 3 | RM: Route-policy r3 :permit/deny: cost 200 | xx:xx:xx | 192.168.1.1/24 | 100 |

⟹

| Destination address | Index | Route event record | Timestamp | Next hop | Cost |
|---|---|---|---|---|---|
| 172.17.0.0/16 | 1 | RM: Route-policy r4 :permit/deny: next-hop | xx:xx:xx | 192.168.2.2/24 | 200 |

FIG. 9

| Destination address | Index | Route event record | Timestamp | Traffic statistics | Next hop | Outbound interface |
|---|---|---|---|---|---|---|
| 10.1.1.1/16 | 1 | ISIS: Route-policy r1 : permit/permit: cost 100 | xx:xx:xx | 1 Gbps | 10.1.1.2 | GE0/0/1 |
| | 2 | RM: Policy-filter acl a1: permit/deny: import | xx:xx:xx | 1.5 Gbps | 10.1.1.2 | GE0/0/1 |
| 10.1.1.3/16 | 1 | RM: Route-policy r2 : permit/deny: import | xx:xx:xx | 0.5 Gbps | 10.1.1.4 | GE0/0/2 |

| Destination address | Index | Route event record | Timestamp | Traffic statistics | Next hop | Outbound interface |
|---|---|---|---|---|---|---|
| 10.1.1.1/16 | 1 | RM: Route-policy r3 : permit/permit: cost 100 | xx:xx:xx | 1.0 Gbps | 10.1.1.2 | GE0/0/1 |
| 10.1.1.3/16 | 1 | RM: Route-policy r3 : permit/deny: cost | xx:xx:xx | 1.0 Gbps | 10.1.1.4 | GE0/0/1 |

FIG. 11

ENTRY PROCESSING METHOD, NETWORK DEVICE, AND CONTROL DEVICE

CROSS-REFERENCE TO RELATED APPLICATIONS

This application is a continuation of International Application No. PCT/CN2019/115173, filed on Nov. 2, 2019, which claims priority to Chinese Patent Application No. 201811303757.2, filed on Nov. 2, 2018. The disclosures of the aforementioned applications are hereby incorporated by reference in their entireties.

TECHNICAL FIELD

This application relates to the communications field, and more specifically, to a route event record entry processing method, a network device, and a control device.

BACKGROUND

Currently, as network communication technologies are rapidly developed and various software and hardware technologies and communications protocols are introduced, network operation and maintenance scenarios become increasingly complex. In addition, automatic and intelligent network operation and maintenance are also a popular trend, and an operation and maintenance mode is gradually changed from human-human interaction and human-machine interaction to machine-machine interaction.

A key process of network operation and maintenance may mainly include collection, report, and analysis of operation and maintenance information. Various technologies and protocols are included in the three phases. Combination of different technologies, protocols, and information content may be applied to different operation and maintenance cases and scenarios. However, network complexity including factors such as diversity of communication technologies and protocol types, differences in networking types, diversity of network device vendors and models, differences in configuration policies for network devices increases a difficulty in network operation and maintenance.

SUMMARY

This application provides a route event record entry processing method, a network device, and a control device, to associatively record a route change and a route policy that causes the change, and facilitate route management.

According to a first aspect, this application provides a route event record entry generation method. The method includes: A network device obtains first information and second information that correspond to a route prefix, where the first information is used to indicate information about a first route policy for the route prefix, and the second information is used to indicate attribute information obtained after processing the route prefix by using the first route policy. The network device generates a route event record entry for the route prefix based on the first information and the second information. The route event record entry includes the route prefix, the first information, and the second information.

In the technical solution, information about route policy processing of the route prefix and a route attribute obtained after processing the same route prefix by using the route policy are used as one record in a record table, and route policy-related information one-to-one corresponds to the route attribute. This facilitates route management.

In an embodiment, that a network device obtains first information and second information that correspond to a route prefix includes: The network device obtains, based on a first route policy processing event for the route prefix, the first information and the second information that correspond to the route prefix.

In the technical solution, the network device obtains the first information and the second information for a first route policy event, to ensure that the first information and the second information are associated with the route prefix.

In an embodiment, the network device obtains, when the first route policy is used to process the route prefix, the first information and the second information that correspond to the route prefix.

In the technical solution, when the route policy is used to process the route prefix, route policy processing event recording is triggered. In this way, an entire process of changing the attribute information of the route prefix can be recorded.

In an embodiment, the first route policy is configured by using a user command line, a configuration message from a network management device, or a control message from a control device.

In the technical solution, when a new route policy is delivered to the network device, a route policy recording event is triggered. In this way, a recording manner can be more flexible.

In an embodiment, the method further includes: The network device obtains, based on a second route policy processing event for the route prefix, third information and fourth information that correspond to the route prefix, and adds the third information and the fourth information to the route event record entry for the route prefix. The third information is used to indicate information about a second route policy for the route prefix. The fourth information is used to indicate attribute information obtained after processing the route prefix by using the second route policy.

In the technical solution, when anew route policy processing event occurs, the network device adds a new record to the original route event record entry. In this way, a route policy is dynamically recorded.

In an embodiment, before the network device obtains the first information and the second information that correspond to the route prefix, the method further includes: The network device enables a route event record function.

In an embodiment, that the network device enables a route event record function includes: The network device enables the route event record function based on a user command line configuration; the network device receives the configuration message from the network management device, and enables the route event record function based on the configuration message; or the network device receives the control message from the control device, and enables the route event record function based on the control message.

In the technical solution, the route event record function is enabled based on the user command line configuration, the configuration message from the network management device, or the control message from the control device. In this way, the route event record function can be used more flexibly.

In an embodiment, after the route event record entry is generated, the method further includes: The network device sends a report message to the control device. The report message includes the route event record entry.

In the technical solution, the network device sends the generated route event record entry to the controller, so that the controller can manage the route prefix.

In an embodiment, the network device periodically or regularly sends the report message to the control device.

In an embodiment, the first information includes at least one of the following information: a name of the first route policy, a module in which the first route policy is performed, a matching result of the first route policy, an action of the first route policy, and a timestamp when the first route policy is performed.

In the technical solution, the first information carries information such as the name of the route policy. When the route event record entry is used, a required route policy can be quickly located.

In an embodiment, the second information includes at least one of the following information: a first next hop, a first outbound interface, and first traffic data.

In an embodiment, the report message is a network monitoring protocol message, a border gateway protocol monitoring protocol BMP message, or a message in a YANG model format.

In the technical solution, the network device may send the report message via messages in a plurality of formats. In this way, the solution is easily implemented.

According to a second aspect, this application provides a route event record entry obtaining method. The method includes: A control device receives a report message sent by a network device. The report message includes a route event record entry for a route prefix. The route event record entry includes the route prefix, first information, and second information. The first information is used to indicate information about a first route policy for the route prefix. The second information is used to indicate attribute information obtained after processing the route prefix by using the first route policy. The control device obtains the route event record entry based on the report message, and manages the route prefix.

In the technical solution, the control device manages the route prefix based on the attribute information of the route prefix and a route policy processing event that causes a change to an attribute of the route prefix. This can improve management efficiency of the control device.

In an embodiment, the route event record entry further includes third information and fourth information. The third information is used to indicate information about a second route policy for the route prefix. The fourth information is used to indicate attribute information obtained after processing the route prefix by using the second route policy.

In the technical solution, when a new route policy processing event occurs, the network device adds a new record to the original route event record entry. In this way, a route policy is dynamically recorded.

In an embodiment, the first information includes at least one of the following information: a name of the first route policy, a module in which the first route policy is performed, a matching result of the first route policy, an action of the first route policy, and a timestamp when the first route policy is performed.

In the technical solution, the first information carries information, such as the name of the route policy. When the route event record entry is used, a required route policy can be quickly located.

In an embodiment, the second information includes at least one of the following information: a first next hop, a first outbound interface, and first traffic data.

In an embodiment, that the control device manages the route prefix includes: when there is an error in the second information, that the first route policy is related to the error is determined based on the report message; or a new route policy is verified based on a report message to which the new route policy is not added and a report message to which the new route policy is added; or a route policy used for traffic optimization is determined based on the first traffic data in the report message.

In the technical solution, the control device manages the route prefix based on the attribute information of the route prefix and the route policy processing event that causes the change of the attribute of the route prefix. This can improve the management efficiency of the control device.

In an embodiment, the report message is a network monitoring protocol message, a border gateway protocol monitoring protocol BMP message, or a message in a YANG model format.

In the technical solution, the network device may send the report message via messages in a plurality of formats. In this way, the solution is easily implemented.

According to a third aspect, this application provides a network device. The network device includes: an obtaining module, configured to obtain first information and second information that correspond to a route prefix, where the first information is used to indicate information about a first route policy for the route prefix, and the second information is used to indicate attribute information obtained after processing the route prefix by using the first route policy; and a processing module, configured to generate a route event record entry for the route prefix based on the first information and the second information, where the route event record entry includes the route prefix, the first information, and the second information.

In the technical solution, information about route policy processing of the route prefix and a route attribute obtained after processing the same route prefix by using the route policy are used as one record in a record table, and route policy-related information one-to-one corresponds to the route attribute. This facilitates route management.

In an embodiment, the obtaining module is configured to, based on a first route policy processing event for the route prefix, obtain the first information and the second information that correspond to the route prefix.

In the technical solution, the network device obtains the first information and the second information for a first route policy event, to ensure that the first information and the second information are associated with the route prefix.

In an embodiment, the processing module is configured to: when the first route policy is used to process the route prefix, obtain the first information and the second information that correspond to the route prefix.

In the technical solution, when the route policy is used to process the route prefix, route policy processing event recording is triggered. In this way, an entire process of changing the attribute information of the route prefix can be recorded.

In an embodiment, the first route policy is configured by using a user command line, a configuration message from a network management device, or a control message from a control device.

In the technical solution, the route event record function is enabled based on the user command line configuration, the configuration message from the network management device, or the control message from the control device. In this way, the route event record function can be used more flexibly.

In an embodiment, the obtaining module is further configured to: based on a second route policy processing event for the route prefix, obtain third information and fourth information that correspond to the route prefix, and the processing module is further configured to add the third information and the fourth information to the route event record entry for the route prefix, the third information is used to indicate information about a second route policy for the route prefix, and the fourth information is used to indicate attribute information obtained after processing the route prefix by using the second route policy.

In the technical solution, when anew route policy processing event occurs, the network device adds a new record to the original route event record entry. In this way, a route policy is dynamically recorded.

In an embodiment, the processing module is further configured to enable a route event record function.

In an embodiment, the processing module is configured to: enable the route event record function according to the command line configured by the user, receive the configuration message from the network management device, and enables the route event record function based on the configuration message, or the network device receives the control message from the control device, and enables the route event record function based on the control message.

In an embodiment, the network device further includes: a sending module, configured to send a report message to the control device. The report message includes the route event record entry.

In the technical solution, the network device sends the generated route event record entry to the controller, so that the controller can manage the route prefix.

In an embodiment, the network device periodically or regularly sends the report message to the control device.

In an embodiment, the first information includes at least one of the following information: a name of the first route policy, a module in which the first route policy is performed, a matching result of the first route policy, an action of the first route policy, and a timestamp when the first route policy is performed.

In the technical solution, the first information carries information, such as the name of the route policy. When the route event record entry is used, a required route policy can be quickly located.

In an embodiment, the second information includes at least one of the following information: a first next hop, a first outbound interface, and first traffic data.

In an embodiment, the report message is a network monitoring protocol message, a border gateway protocol monitoring protocol BMP message, or a message in a YANG model format.

In the technical solution, the network device may send the report message via messages in a plurality of formats. In this way, the solution is easily implemented.

According to a fourth aspect, this application provides a control device. The control device includes: a receiving module, configured to receive a report message sent by a network device, where the report message includes a route event record entry for a route prefix, the route event record entry includes the route prefix, first information, and second information, the first information is used to indicate information about a first route policy for the route prefix, and the second information is used to indicate attribute information obtained after processing the route prefix by using the first route policy; and a processing module, configured to obtain the route event record entry based on the report message, and manage the route prefix.

In the technical solution, the control device manages the route prefix based on the attribute information of the route prefix and the route policy processing event that causes a change of an attribute of the route prefix. This can improve management efficiency of the control device.

In an embodiment, the route event record entry further includes third information and fourth information. The third information is used to indicate information about a second route policy for the route prefix. The fourth information is used to indicate attribute information obtained after processing the route prefix by using the second route policy.

In the technical solution, when a new route policy processing event occurs, the network device adds a new record to the original route event record entry. In this way, a route policy is dynamically recorded.

In an embodiment, the first information includes at least one of the following information: a name of the first route policy, a module in which the first route policy is performed, a matching result of the first route policy, an action of the first route policy, and a timestamp when the first route policy is performed.

In the technical solution, the first information carries information, such as the name of the route policy. When the route event record entry is used, a required route policy can be quickly located.

In an embodiment, the second information includes at least one of the following information: a first next hop, a first outbound interface, and first traffic data.

In an embodiment, the processing module is configured to: when there is an error in the second information, determine, based on the report message, that the first route policy is related to the error; or verify a new route policy based on a report message to which the new route policy is not added and a report message to which the new route policy is added; or determine, based on the first traffic data in the report message, a route policy used for traffic optimization.

In the technical solution, the control device manages the route prefix based on the attribute information of the route prefix and the route policy processing event that causes the change of the attribute of the route prefix. This can improve the management efficiency of the control device.

In an embodiment, the report message is a network monitoring protocol message, a border gateway protocol monitoring protocol BMP message, or a message in a YANG model format.

In the technical solution, the network device may send the report message via messages in a plurality of formats. In this way, the solution is easily implemented.

According to a fifth aspect, this application provides a chip, including a processor and a transceiver, configured to perform the method according to any one of the first aspect or the implementations of the first aspect.

According to a sixth aspect, this application provides a chip, including a processor and a transceiver, configured to perform the method according to any one of the second aspect or the implementations of the second aspect.

According to a seventh aspect, this application provides a network device, including a processor and a transceiver, configured to perform the method according to any one of the first aspect or the implementations of the first aspect.

According to an eighth aspect, this application provides a control device, including a processor and a transceiver, configured to perform the method according to any one of the second aspect or the implementations of the second aspect.

According to a ninth aspect, this application provides a computer-readable storage medium, including an instruction. When the instruction is run on a network device, the network device is enabled to perform the method according to any one of the first aspect or the implementations of the first aspect.

According to a tenth aspect, this application provides a computer-readable storage medium, including an instruction. When the instruction is run on a control device, the control device is enabled to perform the method according to any one of the second aspect or the implementations of the second aspect.

According to an eleventh aspect, this application provides a computer program product. When the computer program product runs on a network device, the network device is enabled to perform the method according to any one of the first aspect or the implementations of the first aspect.

According to a twelfth aspect, this application provides a computer program product. When the computer program product runs on a control device, the control device is enabled to perform the method according to any one of the second aspect or the implementations of the second aspect.

According to a thirteenth aspect, this application provides a network system. The system includes the network device in any one of the third aspect or the implementations of the third aspect and the control device in any one of the fourth aspect or the implementations of the fourth aspect.

BRIEF DESCRIPTION OF DRAWINGS

FIG. 8 is a schematic diagram of route loop diagnosis;

FIG. 9 is a schematic diagram of verifying a new route policy;

FIG. 11 is a schematic diagram of per-route traffic optimization;

DESCRIPTION OF EMBODIMENTS

Figure 1:
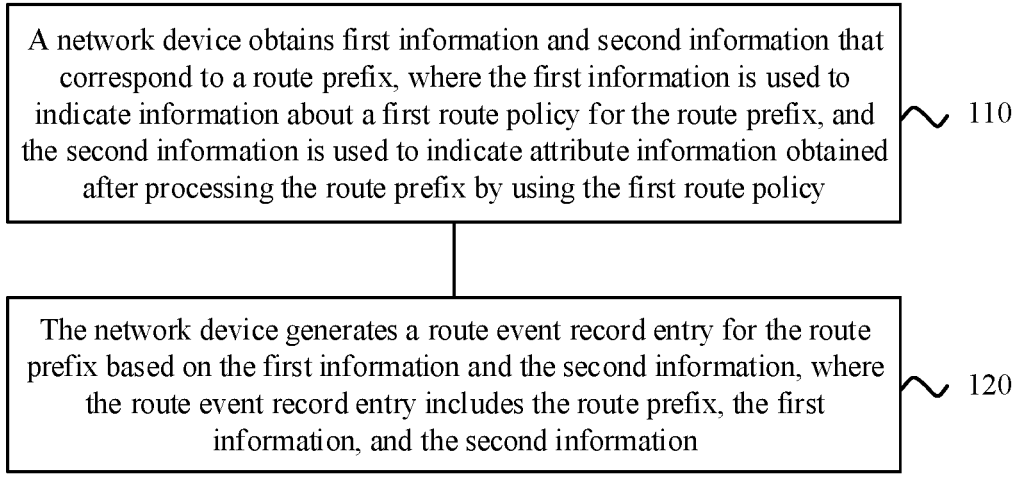
FIG. 1 is a schematic flowchart of a route telemetry method according to an embodiment of this application.

The following describes technical solutions of this application with reference to accompanying drawings.

To facilitate understanding of the solutions in embodiments of this application, concepts and related technologies in this application are first described.

1. Routing table: A routing table is a routing information table stored on a routing device. The table stores paths to embodiment network terminals and stores some metrics about the paths in some cases. The routing device selects a route based on the routing table. Each router stores at least one routing table. The routing table stores routes found by using various route protocols. The routes in the routing table can be classified into the following three types based on different sources:

(1) a route found by using a link layer protocol (also referred to as an interface route or a direct route);

(2) a static route manually configured by a network administrator; and (3) a route found by using a dynamic route protocol.

Each routing device stores a local core routing table, and each route protocol also maintains a routing table of the route protocol. The protocol routing table stores routing information found by using the route protocol, for example, an intermediate system to intermediate system (ISIS) protocol, an open shortest path first (open shortest path first, OSPF) protocol, and a border gateway protocol (BGP). The route protocol can import and export a route generated by using another protocol. For example, if a router runs the OSPF protocol, when the OSPF protocol needs to be used to notify a direct route, a static route, or an ISIS route, all the routes need to be imported into an OSPF protocol routing table. A local core routing table is used to store protocol routes and determine an optimal route. The local core routing table is used to select a route based on priorities and metric values of various route protocols.

Routes generated by using different route protocols, the static route, and the direct route essentially include attributes, such as route prefixes, next-hop addresses, and outbound interfaces. Other attributes of different types of routes are different.

2. Route policy: A route policy is a technology in which a path of network traffic is changed by modifying routing information, and mainly by changing a route attribute. The route policy is an action on a control plane. An action object is a route, and a matching object is a route, which may be a destination address, a mask, a next hop, a metric value, and the like.

The route policy has a plurality of implementations. The implementations (for example, a naming method) for different vendors are different.

Manner 1: The route policy is usually implemented by using an if match clause plus an apply clause. Filters of a route following the if match clause include an access control list (ACL), an IP prefix, an autonomous system (AS) path filter, a community filter, an extcommunity filter, a route distinguisher filter (RD_filter), and the like. Route operations following the apply clause are, for example, modifying a cost, a preference, a route type, a next hop, and a label (tag). The if match clause is used to determine whether a route meets a filter condition of a filter. Whether to perform an operation in the apply clause is determined based on a filtering result (permit/deny).

Manner 2: The route policy is implemented in a manner of filter-policy+import/export. In this manner, the filter-policy (similar to the if match clause) is used to determine whether a route meets a filter condition, and then determine whether to perform an import or export operation. This manner is mainly used to filter a route imported or exported by using an ISIS, OSPF, or a BGP. The filter-policy includes an ACL, an IP prefix, and a route policy.

Manner 3: The route policy is implemented in a manner of peer+filter-policy+import/export. This manner is used to filter a route exported or received by a BGP peer. Compared with the second manner, this manner adds a BGP peer filter condition. In addition, a range of the filter-policy is changed. The filter-policy includes an ACL.

Manner 4: Processing by using some route policies are fixed in a device design. In other words, the route policy is not implemented by policy configuration personnel or network maintenance personnel by using the foregoing command line manner.

3. Route processing procedure: In a route process procedure, a route prefix is processed by different protocol modules after entering a routing device. The different protocol modules may also import a route corresponding to another protocol or a route of another type. Each route protocol module (for example, an ISIS module, an OSPF module, a BGP module, or a multi-protocol label switching (MPLS) protocol module) selects an optimal route corresponding to the protocol, and generates a protocol routing table. A route management (RM) module selects an optimal route from all protocol routing tables based on priorities and metric values of various route protocols, and generates a local core routing table. Then, the core routing table is processed and delivered to a forwarding plane to generate a forwarding information table. Whether a route is delivered to the forwarding information table is also recorded and represented in an attribute of the route in the routing table. In other words, a route prefix is processed by different modules by using different route policies, and one or more attributes of the route change accordingly. Representations of the processing in the routing device are the route policies.

Currently, route-related information collection/report methods in network operation and maintenance means are classified into two types: One is recording a routing table on a routing device; and the other is recording various route policies configured on the routing device. In other words, the routing table and the various route policies are collected and recorded separately. This manner in which the routing table and the various route policies are collected and recorded separately has limited significance for route management. For example, a plurality of BGP route inbound policies are configured on the device. A control device finds an incorrectly imported route from a pre-policy routing table and a post-policy routing table that are collected by using a border gateway protocol monitoring protocol (BMP). In other words, a configured policy takes effect incorrectly. However, which policy does not take effect or takes effect incorrectly cannot be determined.

The embodiments of this application provide a route event record entry generation method, to associatively record a route change and a route policy that causes the change, and facilitate route management.

FIG. 1 is a schematic flowchart of a route telemetry method according to an embodiment of this application. The method in FIG. 1 may be performed by a network device. The method in FIG. 1 includes at least a part of the following content.

110: The network device obtains first information and second information that correspond to a route prefix, where the first information is used to indicate information about a first route policy for the route prefix, and the second information is used to indicate attribute information obtained after processing the route prefix by using the first route policy.

120: The network device generates a route event record entry for the route prefix based on the first information and the second information, where the route event record entry includes the route prefix, the first information, and the second information.

A type of the network device is not limited in an embodiment of the application. The network device may be any network device capable of recording a route. For example, the network device is a router or a switch.

The route prefix is a destination IP address. The route prefix is a route prefix specified by a user, for example, a route prefix that needs to be monitored in real time (for example, a route related to an international gateway), or any one or more of all route prefixes in the network device, for example, in a case in which the network device enables a route event record function for all the route prefixes.

The first route policy includes route policy matching (also referred to as route filtering) and a route-policy action to be performed after the route policy matching.

The first route policy for the route prefix may be understood as: The route prefix is processed by using the first route policy, to change or not to change one or more attributes of the route prefix.

The attribute information obtained after processing the route prefix by using the first route policy may be understood as attribute information of the route prefix obtained after processing the route prefix by using the first route policy.

The information about the first route policy may be at least one of a name of the first route policy, a module in which the first route policy is performed, a matching result of the first route policy, an action of the first route policy, and a timestamp when the first route policy is performed.

The attribute information may be at least one of a first next hop, a first outbound interface, or first traffic data of the route prefix.

The route event record entry includes the route prefix, the first information, and the second information. In other words, the network device associatively records the route prefix, the corresponding first information, and the corresponding second information.

It should be understood that the route event record entry in an embodiment of the application may be a new entry independent of a route entry in the original device.

In the technical solution, information about route policy processing of the route prefix and attribute information obtained after processing the same route prefix by using the route policy are used as one record in a record table, and route policy-related information one-to-one corresponds to the attribute information. This facilitates route management.

In some embodiments, the network device obtains, based on a first route policy processing event for the route prefix, the first information and the second information that correspond to the route prefix. In other words, the route policy processing event triggers a record process of the network device. For example, when the first route policy is used to process the route prefix, the network device obtains the first information and the second information that correspond to the route prefix. There are many methods for the network device to obtain the first information and the second information. This is not limited in an embodiment of the application. In an embodiment, the network device obtains a route attribute of at least one route prefix from the routing table, and obtains, from each protocol module, information about route policy processing. In an embodiment, in some other embodiments, the network device directly backs up the route attribute and the information about the route policy processing, and then directly records the backup route attribute and the backup information about the route policy processing in a record table.

In some embodiments, the first route policy is configured by using a user command line, a configuration message from a network management device, or a control message from a control device.

It should be understood that, after the first route policy is delivered to the network device, when the first route policy is used in a related protocol, the network device is triggered to obtain the first information and the second information that correspond to the route prefix.

In some embodiments, before obtaining the first information and the second information, the network device enables the route event record function for the route prefix. There are many manners for the network device to enable the route event record function for the route prefix. This is not limited in an embodiment of the application. In an embodiment, the network device enables the route event record function based on a user command line configuration. In an embodiment, the network device receives the configuration message from the network management device, and enables the route event record function based on the configuration message. In an embodiment, the network device receives the control message from the control device, and enables the route event record function based on the control message.

It should be understood that the network management device and the control device may be different devices, or may be different functional modules or different components of a same device. This is not limited in an embodiment of the application.

In some embodiments, the network device obtains, based on a second route policy processing event for the route prefix, third information and fourth information that correspond to the route prefix, and adds the third information and the fourth information to the route event record entry for the route prefix. The third information is used to indicate information about a second route policy for the route prefix. The fourth information is used to indicate attribute information obtained after processing the route prefix by using the second route policy.

It should be understood that the first route policy processing event and the second route policy processing events are merely used as an example in an embodiment of the application. The method in an embodiment of the application may be applied to more cases in which route policy processing events occur. In other words, for the same route prefix, route policy processing events continuously occur, and content is gradually added to the route event record entry. For example, the content may be sequentially added to the route event record entry for the route prefix according to a time sequence.

In some embodiments, the route event record entry further includes a first route event index and/or a second route event index. The first route event index corresponds to the first information and the second information. The second route event index corresponds to the third information and the fourth information.

The route event record entry in an embodiment of the application is described with reference to an example.

Table 1 shows a route in an existing ISIS module. Table 2 shows the route event record entry in an embodiment of the application. It should be understood that Table 2 is merely an example, and the record table in an embodiment of the application may alternatively be presented in another form or format.

TABLE 1

| Destination address/Mask | Next hop | Outbound interface | Internal cost | External cost | Flag |
|---|---|---|---|---|---|
| 10.1.1.1/16 | 10.1.1.2 | GE 0/0/1 | 10 | — | D/—/l/— |

TABLE 2

| Destination address/Mask | Route event index | Route event record | Timestamp | Next hop | Outbound interface | Internal cost (cost) | External cost | Flag | Protocol | Traffic data |
|---|---|---|---|---|---|---|---|---|---|---|
| 10.1.1.1/16 | 1 | ISIS: Route-policy r2 node n1: permit/permit: cost 100 | XX: XX: XX | 10.1.1.2 | GE 0/0/1 | 100 | — | D/—/l/— | ISIS | NA |
| | 2 | RM: Policy-filter acl a1: permit/deny: import | XX: XX: XX | 10.1.1.2 | GE 0/0/1 | 200 | — | D/—/l/— | ISIS | XXXX |

It can be seen that, in comparison with Table 1, in Table 2, each route policy processing of a route prefix is recorded once. In addition to the attribute information of the route prefix shown in Table 1, Table 2 also correspondingly records several pieces of information related to the route policy processing.

For example, the following several types of information are added in Table 2 on a basis of the original route attribute.

Route event index: The route event index is recorded and increased by 1 in a time sequence when processing is completed by using one route policy.

Route event record: The route event record is performed in a recording format of aa:bb:cc:dd, where aa is used to record a module in which a route policy is performed, for example, an ISIS module, an OSPF module, a BGP module, and an RM module; bb is used to record a route policy name, for example, a route policy filter, an ACL name or index, a route policy name or index, a route policy node index, or may be unknown, for example, the foregoing fourth route policy implementation; cc is used to record a matching result (whether permit/match) of a route policy, for example, a permit/permit type, or may be unknown, for example, the foregoing fourth route policy implementation; and dd is used to record an action of the route policy, for example, a route-policy action, import, export, or may be unknown, for example, the foregoing fourth route policy implementation.

Traffic data: The traffic data is traffic statistics information of each entry in a forwarding table (FIB).

It should be understood that, because attributes in different protocol routing tables are different, and vendors are also different, not all attributes are listed in Table 2, and all the attributes fall within the protection scope of this application, provided that the three types of information are added to a route attribute obtained after processing the route prefix by using the route policy each time.

In some embodiments, after generating the route event record entry, the network device sends a report message to the control device. The report message includes the route event record entry. Route event record entries for different route prefixes may be carried as a whole in the report message, or a plurality of route event record entries may be separately carried in the report message event record. This is not limited in an embodiment of the application.

The report message in an embodiment of the application may be reported at different frequencies, for example, regularly, in real time, or periodically in different cases.

The report message in an embodiment of the application has a plurality of formats. This is not limited in an embodiment of the application.

Figure 2:
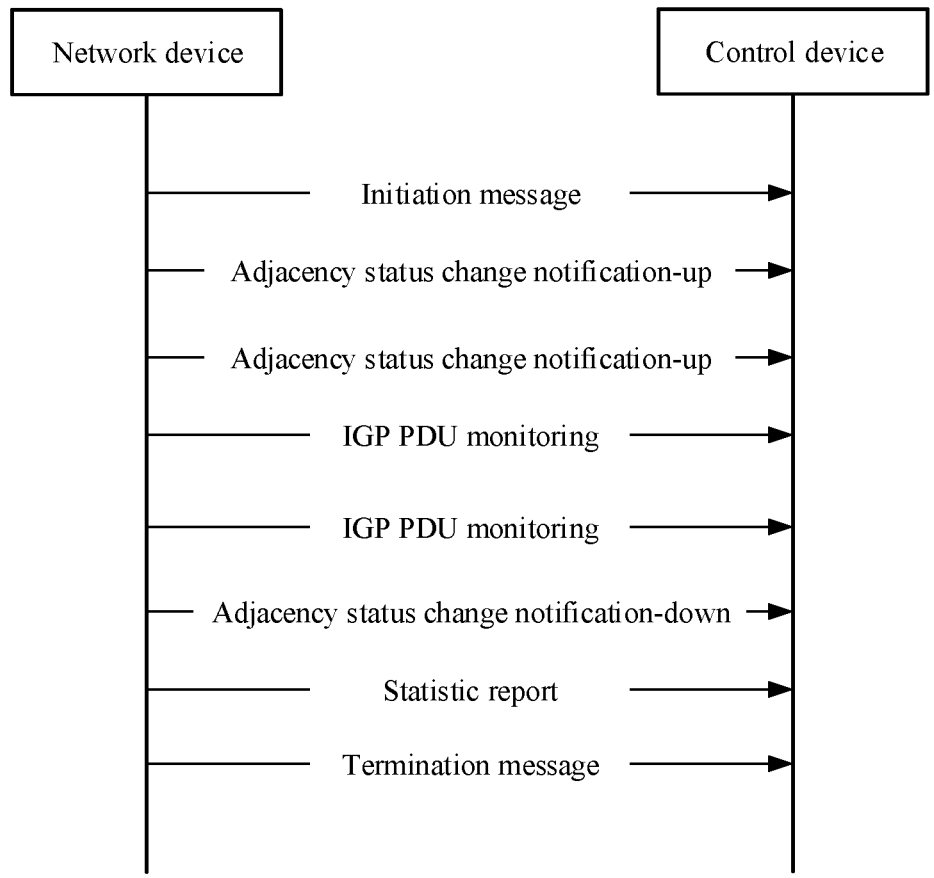
FIG. 2 shows a schematic interaction procedure of a dedicated network monitoring protocol according to an embodiment of this application.

In some embodiments, the report message may be a dedicated network monitoring protocol message. For example, one dedicated network monitoring protocol is defined for information exchange between the network device and the control device. FIG. 2 shows a schematic interaction procedure of a dedicated network monitoring protocol according to an embodiment of this application.

As shown in FIG. 2, the network monitoring protocol in an embodiment of the application defines six message types.

Type 0: An initiation message, that is, a first message after a network monitoring protocol session is established, is in this type, and carries basic information of a network device.

Type 1: An adjacency status change notification is in this type. This message is a reminder message used by each network device to notify up and down of an adjacency relationship of the network device after the network monitoring protocol is initialized.

Type 2: A statistic report is in this type, and is used to report statistics information to a control device.

Type 3: An interior gateway protocol (IGP) protocol data unit (PDU) monitoring message is in this type. This message is used to encapsulate, in a form, an IGP protocol packet that is sent or received.

Type 4: A termination message is in this type. This message is sent by the network device to the control device when the network device needs to proactively terminate a connection.

Type 5: A route event record message (RoFT message) is in this type, corresponds to the foregoing report message, and is used by the network device to report a route event record entry to the control device.

All messages in Type 1, Type 2, and Type 3 are in a format of network monitoring protocol common header+per-adjacency header+type-length-value (TLV). Messages in Type 0, Type 4, and Type 5 are in a format of common header+TLV.

Figure 3:
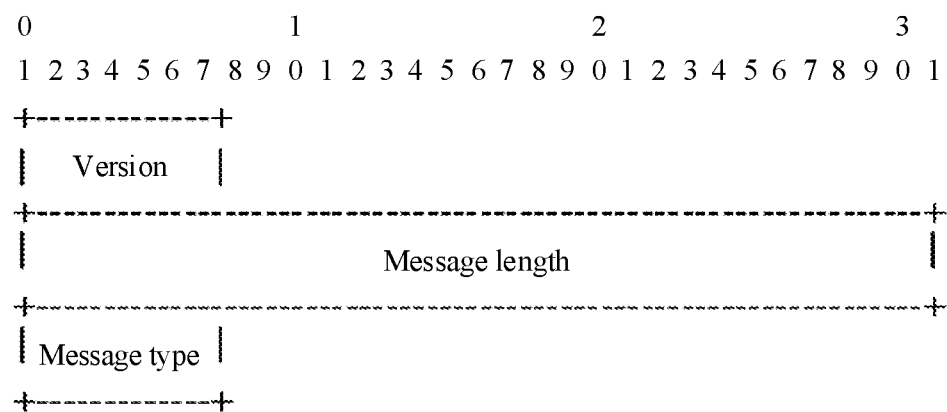
FIG. 3 shows a format of a common header of a dedicated network monitoring protocol.

FIG. 3 shows a format of a common header of a dedicated network monitoring protocol. A version (version) field defines a version number of the network monitoring protocol, for example, starting from 00. A message length field defines a length of the message. A message type field defines a type of a message, that is, one in the foregoing six defined message types.

A format of the per-adjacency header may have a plurality of implementations. The per-adjacency header needs to include a circuit type of an adjacency relationship, a system identifier of a peer device with the adjacency relationship, area identifier of the peer device with the adjacency relationship, and a timestamp.

Figure 4:
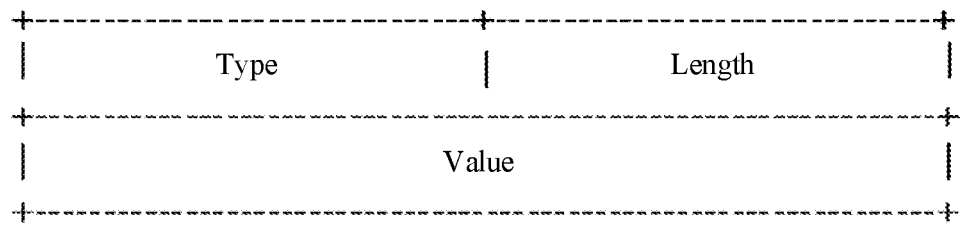
FIG. 4 shows a format of a TLV of a dedicated network monitoring protocol.

FIG. 4 shows a format of a TLV of a dedicated network monitoring protocol. A length of each field in the format of the TLV is variable. A type field defines a type of the described information. A length field defines a length of a value field. The value field carries information value specified in the type field. Different TLV types may be defined to describe different information based on different types of defined fields. Each message can include one or more TLVs as required.

A message in Type 5 is a message specially used to report a record table. The type of message is also defined in the foregoing format. A definition of a more specific format is shown in FIG. 5.

Figure 5:
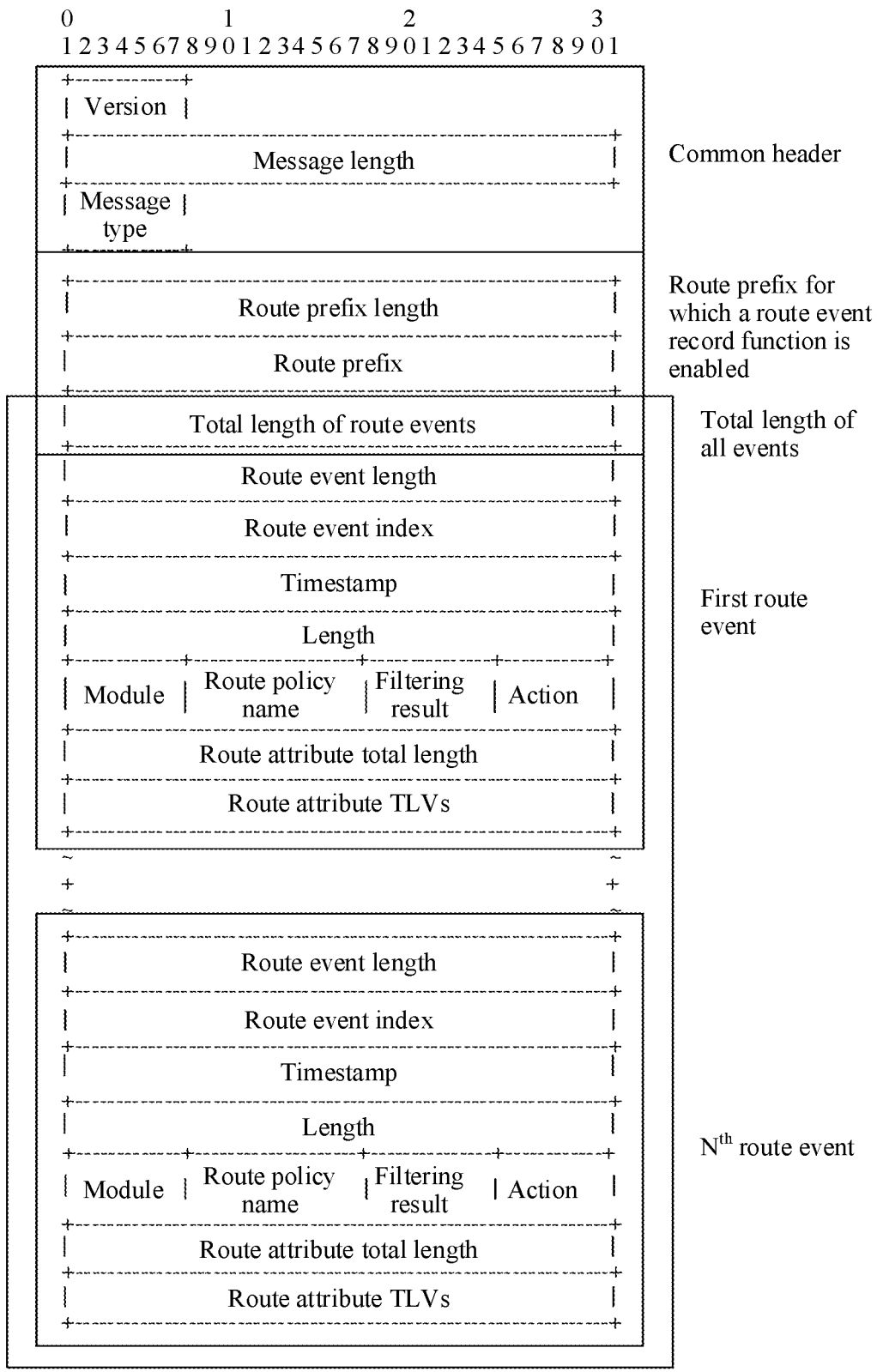
FIG. 5 shows a format of a report message according to an embodiment of this application.

As shown in FIG. 5, the message in Type 5 is in a format, namely, including a common header, a route prefix, and a route processing event for the route prefix, where the common header is a dedicated network monitoring protocol common header; the route prefix is prefix length+route prefix for which event record is enabled; and the route processing event of the route prefix is total length of all events+N×(route event length+route event index+timestamp+length+processing module+route policy name+filtering result+action+route attribute, namely, attributes of the route prefix), where N indicates a quantity of route events carried in the message.

Figure 6:
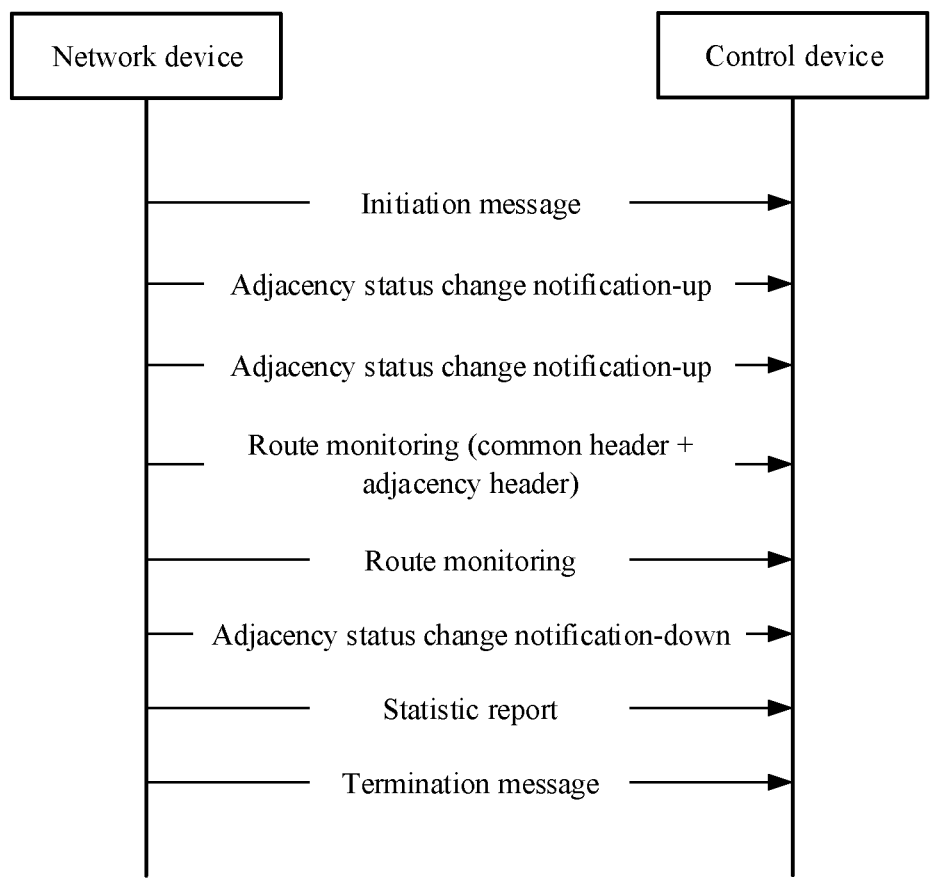
FIG. 6 is a schematic interaction procedure of a BMP message.

In some other embodiments, the report message may be an extended BMP message. A BMP is a monitoring protocol of a BGP protocol (the RFC 7854). That Adj-RIB-In information is collected through exchanging the BMP message is defined in the RFC 7854. The Adj-RIB-In information mainly includes basic routing information, for example, an IP version 4 (IPv4) public network route, an IPv4 private network route, an IP version 6 (Ipv6) public network route, and an IPv6 private network route. Currently, the RFC 7854 defines seven message types. FIG. 6 is a schematic interaction procedure of a BMP message.

For example, Type 0 is route monitoring. An Adj-rib-in route of a peer is notified through the peer (peer). Routing information in a form of a BGP update packet is used as a data part of the BMP message. After the route is sent, end-of-rib (End-of-Rib) needs to be sent.

A message in Type 1 is a statistic report, and is used to report statistics to a control device.

A message in Type 2 is peer down notification, to notify that an adjacency is down.

A message in Type 3 is peer up notification, to notify that the adjacency is up after initialization.

A message in Type 4 is an initiation message, a first message after a network monitoring protocol session is established, and carries basic information about a network device.

A message in Type 5 is a termination message, and is sent by the network device to the control device to down a connection.

A message in Type 6 is route mirroring, to report an uncompressed BGP Adj-rib-in packet.

To report a route event record message, a new message type is extended in an embodiment of this application. A message type number needs to be allocated by the internet assigned numbers authority (IANA).

A to-be-determined (TBD) type is a route event record message (RoFT message), and corresponds to the report message.

The route event record message is in a format, namely, including a BMP common header and a TLV. The common header may reuse an existing common header format defined in the BMP. A message type field specifies a message type, including seven existing message types of the BMP and the newly defined message type. For a format of the TLV, refer to FIG. 4. The length of each field in the format of the TLV is variable. The type field defines the type of the described information. The length field defines the length of the value field. The value field carries the information value specified in the type field. The different TLV types may be defined to describe the different information based on the different types of defined fields. For example, if an information type corresponding to the type number is defined as an ISIS LSP packet, the length field describes a length of the ISIS LSP packet, and the value field is an ISIS link state packet (LSP) packet. Each message can include one or more TLVs as required.

The route event record message is in a message format, namely, including a BMP common header, a route prefix, and a route processing event of the route prefix. The route prefix is prefix length+route prefix enabling event record. The route processing event of the route prefix is total length of all events+N×(route event length+route event index+timestamp+length+processing module+route policy name+filtering result+action+route attribute, namely, attributes of the route prefix), where N indicates a quantity of route events carried in the message. For details about the route prefix, the route processing event of the route prefix, and various route attributes, refer to FIG. 5. Details are not described herein again.

In some other embodiments, the report message may be a message in a YANG (yet another next generation) model format. For example, a message that needs to be reported may be defined in the YANG model format. Then a YANG database is encoded and reported by using an existing telemetry means, for example, a network configuration (Netconf) protocol, and a Google remote procedure call technology (gRPC). There are a plurality of implementations for defining the YANG model of the routing information, provided that all information types listed in an embodiment of the application are defined in one or more YANG models. For example, information that needs to be included includes the route prefix, a route processing event index, a route policy event, the route fate timestamp, traffic data, various attributes of the route, and the like.

There are the plurality of implementations for defining the YANG model. The YANG model in current update may be extended and referenced. A specific format is not listed here.

A telemetry function in an embodiment of the application may be triggered by different conditions and report frequencies. This section describes several typical application scenarios and corresponding triggering conditions.

Scenario 1: New Policy Verification

Each time a new policy is configured for a network device, correctness needs to be verified. Before the configuration is committed, a route event record function is enabled for all routes or a specific route to report in real time. This facilitates to detect a problem in a timely manner. The route event record enabled for the specific route helps a user to understand a configuration effect and a configuration risk.

Scenario 2: Regular Inspection of a Policy Monitoring Degree

All routes are recorded and checked periodically. After a period of time of recording, the routes are packed and sent to a control device for health analysis. The application does not have a high requirement on real-time performance, but has a high requirement on coverage. Therefore, this function needs to be enabled for all the routes.

Scenario 3: Real-Time Monitoring of an Important Route

An important route, for example, a route specified by a user, a route related an international gateway is monitored in real time.

Based on a trigger condition of the telemetry function and a report frequency of a record table, Table 3 lists a typical application scenario and a corresponding trigger condition of triggering the route telemetry function. It should be understood that the application scenario and the trigger condition in Table 3 are merely an example. An embodiment of the application is not limited thereto.

TABLE 3

| | Report a trigger policy: real-time report | Report a trigger policy: regular report |
| --- | --- | --- |
| Record a trigger object: per route<br>Record a trigger condition: deliver a route policy/configuration | Application scenario: new policy/configuration verification | |
| Record a trigger object: a specific route<br>Record a trigger condition: deliver a new policy/configuration | Application scenario: new policy/configuration verification (a user specifies a configuration effect and verifies only a related route.) | |
| Record a trigger object: per route<br>Record a trigger condition: specified by a user | | Application scenario: regular inspection of policy health |
| Record a trigger object: a specific route<br>Record a trigger condition: specified by a user | Application scenario: Real-time monitoring of an important route | |

In some embodiments, the control device receives the report message sent by the network device, obtains the route event record entry based on the report message, and manages the route prefix. For example, when there is an error in the second information, that the first route policy is related to the error is determined based on the report message; or a new route policy is verified based on a report message to which the new route policy is not added and a report message to which the new route policy is added; or a route policy used for optimization is determined based on the first traffic data in the report message.

The following describes an application of the route event record entry with reference to a specific example.

In some embodiments, when there is the error in the second information, the control device may determine, based on the route event record entry, the first route policy related to the error.

Figure 7:
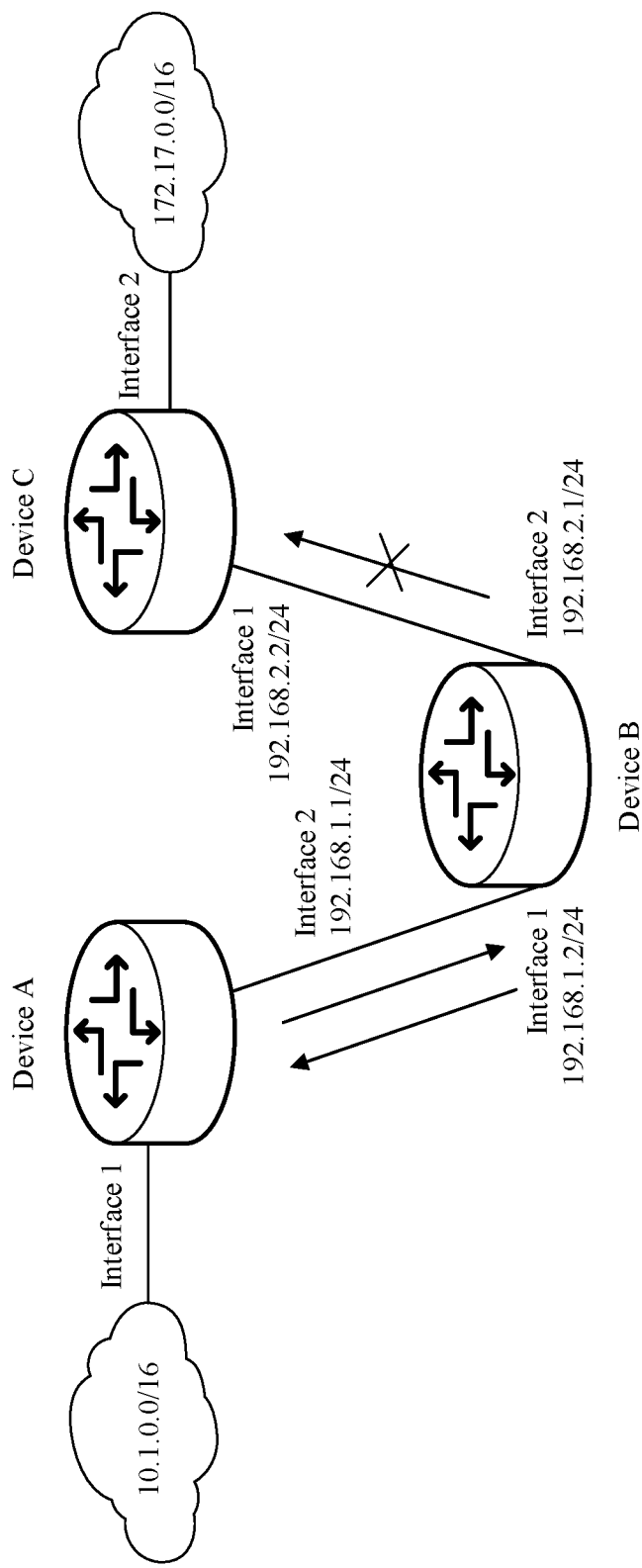
FIG. 7 is a schematic diagram of a route loop.

Diagnosis of a root cause of a route loop is used as an example. FIG. 7 is a schematic diagram of the route loop. A route on a device A to 172.17.0.0/16 points to a device B. A route on a device B to 172.17.0.0/16 should point to a device C, but points to the device A due to a reason. In this case, the route loop to 172.17.0.0/16 is formed between the device A and the device B. Packets sent from the device A and the device B to 172.17.0.0/16 are circularly forwarded between the device A and the device B.

A route event record function is enabled for all routes or some routes (including 172.12.0.0/16) on the device B.

After the loop occurs, the loop is found (for example, when a time to live (time to live, TTL) expires, the loop is reported) through a manner, for example, alarming, and devices A and B are located. A control device analyzes a route event record entry in a report message sent by the device B, analyzes a route policy in each operation and a route attribute change based on the route event record entry of 172.17.0.0/16 reported by the device B, and determines whether the route attribute change in the route policy in each operation meets expectation of a corresponding route policy. For example, as shown in FIG. 8, a next hop of 172.17.0.0/16 changes from 192.168.2.2/24 (the device C) to 192.168.1.1/24 (the device A) due to a route policy processing event whose index is 2. As a result, a loop occurs. The change does not meet the expectation. Therefore, the root cause is that a route policy r2 (route-policy r2) is incorrectly configured.

It should be understood that the control device may further diagnose the error in the second information in another case based on the route event record entry. This is not limited in an embodiment of the application.

In some other embodiments, the control device verifies the new route policy based on a report message to which the new route policy is not added and a report message to which the new route policy is added.

Diagnosis of a root cause of a route loop is used as an example. A route on a device A to 172.17.0.0/16 points to a device B. A route on a device B to 172.17.0.0/16 should point to a device C, but points to the device A due to a reason. In this case, the route loop to 172.17.0.0/16 is formed between the device A and the device B. Packets sent from the device A and the device B to 172.17.0.0/16 are circularly forwarded between the device A and the device B. A loop fault is described in the preceding section.

Before the loop occurs, a route event record function is enabled for all routes or some routes (including 172.12.0.0/16) on the device B. Alternatively, after the loop is detected and before new configuration is delivered, a route event record function is enabled for all routes or some routes (including 172.12.0.0/16) on the device B.

For details about a route loop diagnosis process, refer to the foregoing description. After locating that the loop is caused by the incorrect route policy r2 of the device B, maintenance personnel modify the route policy, rename as a new policy name r4, and deliver r4 to the device B. The device B reports the route event record entry of the route prefix after the new policy is delivered. As shown in FIG. 9, the control device analyzes the route event record entry and finds that a route change meets the expectation after the new policy is configured, and the loop disappears. This verifies correctness of the new policy.

In some other embodiments, the control device determines, based on the first traffic data in the report message, the route policy used for traffic optimization.

Figure 10:
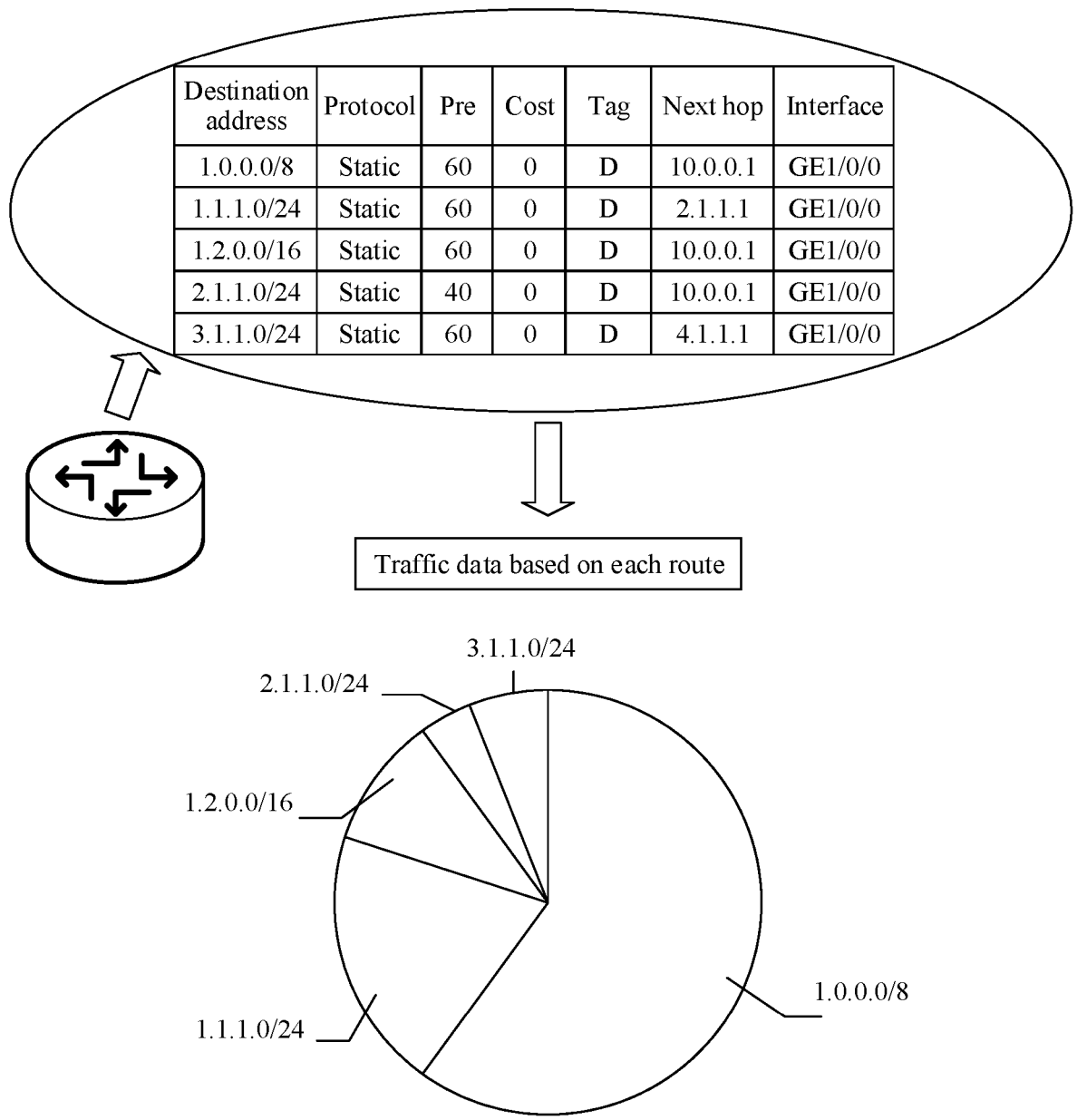
FIG. 10 is a schematic diagram of per-route traffic statistics.

For example, a route event record function is enabled for a route prefix concerned by a user to collect traffic statistics of each route. The control device analyzes and collects the traffic data in the route event record entry in the report message sent by the network device, and performs visualization (as shown in FIG. 10). The user optimizes the traffic based on the statistics result. A route policy r3 is delivered. After the route policy r3 is delivered, traffic data about the routes is recollected (as shown in FIG. 11) to verify whether the traffic data meets an expected result of the optimization performed by the user.

The route event record entry in an embodiment of the application has many other applications, which are not listed one by one herein.

Figure 12:
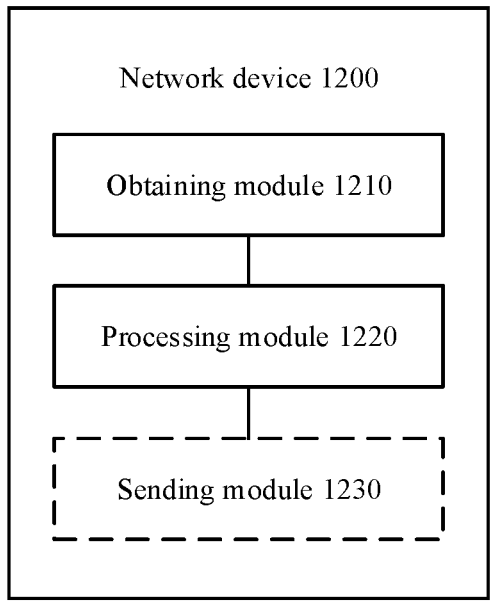
FIG. 12 is a schematic structural diagram of a network device according to an embodiment of this application.

FIG. 12 is a schematic structural diagram of a network device according to an embodiment of this application. As shown in FIG. 12, the network device 1200 includes an obtaining module 1210 and a processing module 1220.

The obtaining module 1210 is configured to obtain first information and second information that correspond to a route prefix. The first information is used to indicate information about a first route policy for the route prefix. The second information is used to indicate attribute information obtained after processing the route prefix by using the first route policy. The processing module is configured to generate a route event record entry for the route prefix based on the first information and the second information. The route event record entry includes the route prefix, the first information, and the second information.

The obtaining module 1210 is configured to obtain, based on a first route policy processing event for the route prefix, the first information and the second information that correspond to the route prefix.

The obtaining module 1210 is configured to obtain, when the first route policy is used to process the route prefix, the first information and the second information that correspond to the route prefix.

The obtaining module 1210 is further configured to obtain, based on a second route policy processing event for the route prefix, third information and fourth information that correspond to the route prefix. The processing module 1220 is further configured to add the third information and the fourth information to the route event record entry for the route prefix. The third information is used to indicate information about a second route policy for the route prefix. The fourth information is used to indicate attribute information obtained after processing the route prefix by using the second route policy.

In an embodiment, the network device further includes a sending module 1230, configured to send a report message to a control device. The report message includes the route event record entry.

The obtaining module 1210 and the processing module 1220 may be implemented by a processor. The sending module 1230 may be implemented by a transmitter. For functions and beneficial effects of the obtaining module 1210, the processing module 1220, and the sending module 1230, refer to the method shown in FIG. 1. Details are not described herein again.

Figure 13:
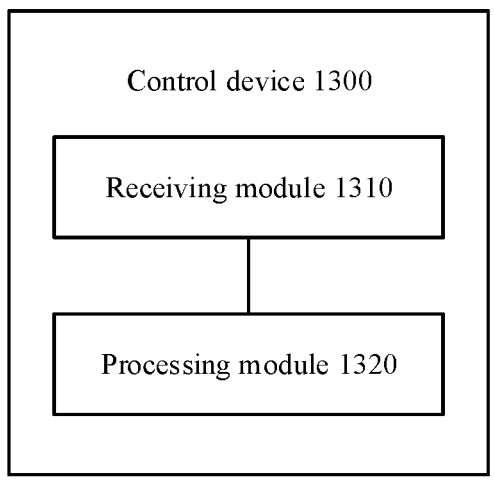
FIG. 13 is a schematic structural diagram of a control device according to an embodiment of this application.

FIG. 13 is a schematic structural diagram of a control device according to an embodiment of this application. As shown in FIG. 13, the control device 1300 includes a receiving module 1310 and a processing module 1320.

The receiving module 1310 is configured to receive a report message sent by a network device. The report message includes a route event record entry for a route prefix. The route event record entry includes the route prefix, first information, and second information. The first information is used to indicate information about a first route policy for the route prefix. The second information is used to indicate attribute information obtained after processing the route prefix by using the first route policy.

The processing module 1320 is configured to obtain the route event record entry based on the report message, and manage the route prefix.

The processing module 1320 is configured to: when there is an error in the second information, determine, based on the report message, that the first route policy is related to the error; or verify a new route policy based on a report message to which the new route policy is not added and a report message to which the new route policy is added; or determine, based on the first traffic data in the report message, a route policy used for traffic optimization.

The receiving module 1310 may be implemented by a receiver. The processing module 1320 may be implemented by a processor. For functions and beneficial effects of the receiving module 1310 and the processing module 1320, refer to the method shown in FIG. 1. Details are not described herein again.

Figure 14:
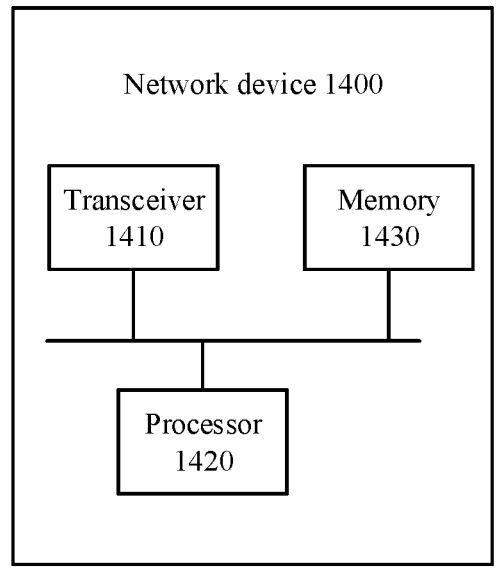
FIG. 14 is a schematic structural diagram of a network device according to another embodiment of this application.

FIG. 14 is a schematic structural diagram of a network device according to another embodiment of this application. As shown in FIG. 14, the network device 1400 includes a transceiver 1410, a processor 1420, and a memory 1430.

FIG. 14 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in an embodiment of the application.

The transceiver 1410, the processor 1420, and the memory 1430 communicate with each other through an internal connection path, to transfer a control signal and/or a data signal.

For example, the processor 1420 is configured to: obtain first information and second information that correspond to a route prefix, where the first information is used to indicate information about a first route policy for the route prefix, and the second information is used to indicate attribute information obtained after processing the route prefix by using the first route policy; generate a route event record entry for the route prefix based on the first information and the second information, where the route event record entry includes the route prefix, the first information, and the second information.

The transceiver 1410 is configured to send a report message to a control device. The report message includes the route event record entry.

The route event record entry may be generated by a processing module in the processor 1420.

For a working process and beneficial effects of the network device 1400, refer to the descriptions in the embodiment shown in FIG. 1.

Figure 15:
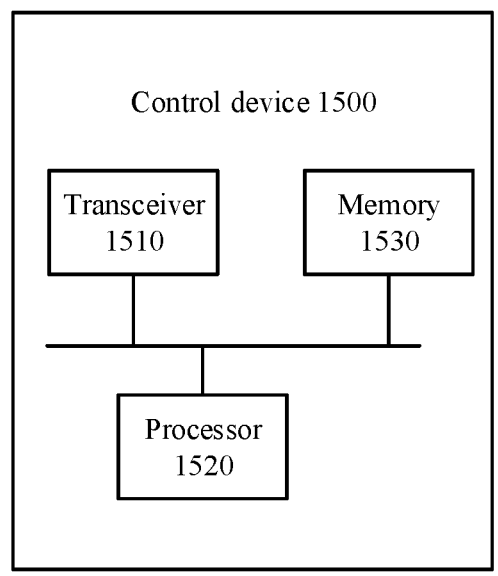
FIG. 15 is a schematic structural diagram of a control device according to another embodiment of this application.

FIG. 15 is a schematic structural diagram of a control device according to another embodiment of this application. As shown in FIG. 15, the control device 1500 may include a transceiver 1510, a processor 1520, and a memory 1530.

FIG. 15 shows only one memory and one processor. In an actual control device product, there may be one or more processors and one or more memories. The memory may also be referred to as a storage medium, a storage device, or the like. The memory may be disposed independent of the processor, or may be integrated with the processor. This is not limited in an embodiment of the application.

The transceiver 1510, the processor 1520, and the memory 1530 communicate with each other through an internal connection path, to transfer a control signal and/or a data signal.

For example, the transceiver 1510 is configured to receive a report message sent by a network device. The report message includes a route event record entry for a route prefix. The route event record entry includes the route prefix, first information, and second information. The first information is used to indicate information about a first route policy for the route prefix. The second information is used to indicate attribute information obtained after processing the route prefix by using the first route policy.

The processor 1520 is configured to obtain the route event record entry based on the report message, and manage the route prefix.

For a working process and beneficial effects of the control device 1500, refer to the descriptions in the embodiment shown in FIG. 1.

The transceiver described in the embodiments of this application may also be referred to as a transceiver unit, a transceiver, a transceiver apparatus, or the like. The processor may also be referred to as a processing unit, a processing board, a processing module, a processing apparatus, or the like. In an embodiment, a component that is in the transceiver and that is configured to implement a receiving function may be considered as a receiving unit, and a component that is in the transceiver and that is configured to implement a sending function may be considered as a sending unit. In other words, the transceiver includes the receiving unit and the sending unit. The receiving unit may also be sometimes referred to as a receiver, a receiver circuit, or the like. The sending unit may also be sometimes referred to as a transmitter, a transmitter circuit, or the like.

The memory described in the embodiments of this application is configured to store a computer instruction and a parameter for running the processor.

The processor in the embodiments of this application may be an integrated circuit chip, and is capable of signal processing. In an implementation process, operations in the foregoing methods can be implemented by using a hardware integrated logical circuit in the processor, or by using instructions in a form of software. The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the operations, and logical block diagrams that are disclosed in the embodiments of this application. The general purpose processor may be a microprocessor, the processor may be any conventional processor, or the like. Operations of the methods disclosed with reference to the embodiments of this application may be directly performed by a hardware decoding processor, or by using a combination of hardware and software modules in the decoding processor. A software module may be located in a mature storage medium in the art, for example, a random access memory (RAM), a flash memory, a read-only memory (ROM), a programmable read-only memory, an electrically erasable programmable memory, a register, or the like. The storage medium is located in the memory. A processor reads instructions in the memory and completes the operations in the foregoing methods in combination with hardware of the processor.

Figure 16:
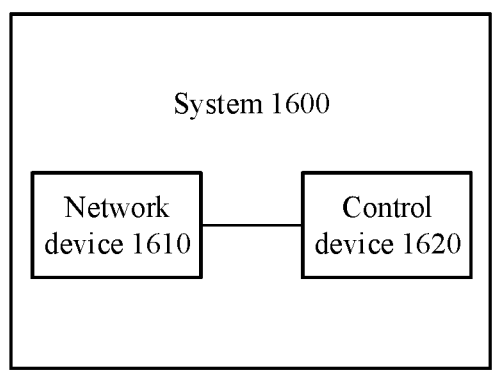
FIG. 16 is a schematic architectural diagram of a network system according to an embodiment of this application.

FIG. 16 is a schematic architectural diagram of a network system according to an embodiment of this application. The system 1600 includes a network device 1610 and a control device 1620. The network device 1610 is the network device described in FIG. 12 or FIG. 14. The control device 1620 is the control device described in FIG. 13 or FIG. 15. For detailed descriptions of devices in the system, refer to the descriptions in the embodiments shown in FIG. 12 to FIG. 15. Details are not described herein again.

The network device and the control device in the embodiment of this application may be devices of a centralized structure, or may be devices of a distributed structure. This is not limited in the embodiment of this application.

Sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for indicating a computer device (which may be a personal computer, a server, or a network device) to perform all or some of the operations of the methods described in the embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A route event record entry generation method, comprising:
    obtaining, by a network device, first information and second information corresponding to a route prefix, wherein the first information includes a first route policy for the route prefix, and wherein the second information includes attribute information obtained after processing a route corresponding to the route prefix by using the first route policy; and
    generating, by the network device, a route event record entry for the route prefix based on the first information and the second information, wherein the route event record entry comprises the route prefix, the first information, and the second information.

2. The method according to claim 1, wherein the obtaining first information and the second information comprises:
    obtaining, by the network device, based on a first route policy processing event for the route prefix, the first information and the second information corresponding to the route prefix.

3. The method according to claim 1, further comprising:
    obtaining, by the network device, based on a second route policy processing event for the route prefix, third information and fourth information corresponding to the route prefix; and
    adding the third information and the fourth information to the route event record entry for the route prefix, wherein the third information includes a second route policy for the route prefix, and wherein the fourth information includes attribute information obtained after processing the route prefix by using the second route policy.

4. The method according to claim 1, wherein after the generating the route event record entry, the method further comprises:
    sending, by the network device, a report message to a control device, wherein the report message comprises the route event record entry.

5. The method according to claim 4, wherein the report message is a network monitoring protocol message, an extended border gateway protocol monitoring protocol (BMP) message, or a message in a YANG model format.

6. The method according to claim 1, wherein the first information comprises: a name of the first route policy, a module in which the first route policy is performed, a matching result of the first route policy, an action of the first route policy, or a timestamp when the first route policy is performed.

7. The method according to claim 1, wherein the second information comprises: a first next hop, a first outbound interface, or first traffic data.

8. A route event record entry obtaining method, comprising:
receiving, by a control device, a report message sent by a network device, wherein the report message comprises a route event record entry for a route prefix, wherein the route event record entry comprises the route prefix, first information, and second information, wherein the first information includes a first route policy for the route prefix, and wherein the second information includes attribute information obtained after processing a route corresponding to the route prefix by using the first route policy; and
obtaining, by the control device, the route event record entry based on the report message, and managing the route prefix.

9. The method according to claim 8, wherein the route event record entry further comprises third information and fourth information, wherein the third information includes a second route policy for the route prefix, and wherein the fourth information includes attribute information obtained after processing the route prefix by using the second route policy.

10. The method according to claim 8, wherein the first information comprises: a name of the first route policy, a module in which the first route policy is performed, a matching result of the first route policy, an action of the first route policy, or a timestamp when the first route policy is performed.

11. The method according to claim 8, wherein the second information comprises:
a first next hop, a first outbound interface, or first traffic data.

12. The method according to claim 8, wherein the managing the route prefix comprises:
when there is an error in the second information, determining, based on the report message, that the first route policy is related to the error; or
verifying a new route policy based on a report message to which the new route policy is not added and a report message to which the new route policy is added; or
determining, based on first traffic data in the report message, a route policy used for traffic optimization.

13. The method according to claim 8, wherein the report message is a network monitoring protocol message, a border gateway protocol monitoring protocol (BMP) message, or a message in a YANG model format.

14. A network device, comprising:
a transceiver; and
a processor configured to:
obtain first information and second information corresponding to a route prefix, wherein the first information includes a first route policy for the route prefix, and wherein the second information includes attribute information obtained after processing a route corresponding to the route prefix by using the first route policy; and
generate a route event record entry for the route prefix based on the first information and the second information, wherein the route event record entry comprises the route prefix, the first information, and the second information.

15. The network device according to claim 14, wherein the processor is configured to, based on a first route policy processing event for the route prefix, obtain the first information and the second information corresponding to the route prefix.

16. The network device according to claim 14, wherein the processor is further configured to:
obtain, based on a second route policy processing event for the route prefix, third information and fourth information corresponding to the route prefix, and
add the third information and the fourth information to the route event record entry for the route prefix, wherein the third information includes a second route policy for the route prefix, and wherein the fourth information includes attribute information obtained after processing the route prefix by using the second route policy.

17. The network device according to claim 14, wherein the transceiver is configured to send a report message to a control device, wherein the report message comprises the route event record entry.

18. The network device according to claim 17, wherein the report message is a network monitoring protocol message, a border gateway protocol monitoring protocol (BMP) message, or a message in a YANG model format.

19. The network device according to claim 14, wherein the first information comprises: a name of the first route policy, a module in which the first route policy is performed, a matching result of the first route policy, an action of the first route policy, or a timestamp when the first route policy is performed.

20. The network device according to claim 14, wherein the second information comprises: a first next hop, a first outbound interface, or first traffic data.

21. A control device, comprising:
a transceiver configured to receive a report message sent by a network device, wherein the report message comprises a route event record entry for a route prefix, the route event record entry comprises the route prefix, first information, and second information, wherein the first information includes a first route policy for the route prefix, and wherein the second information includes attribute information obtained after processing a route corresponding to the route prefix by using the first route policy; and
a processor configured to obtain the route event record entry based on the report message, and manage the route prefix.

22. The control device according to claim 21, wherein the route event record entry further comprises third information and fourth information, wherein the third information includes a second route policy for the route prefix, and wherein the fourth information includes attribute information obtained after processing the route prefix by using the second route policy.

23. The control device according to claim 21, wherein the first information: a name of the first route policy, a module in which the first route policy is performed, a matching result of the first route policy, an action of the first route policy, or a timestamp when the first route policy is performed.

24. The control device according to claim 21, wherein the second information comprises: a first next hop, a first outbound interface, or first traffic data.

25. The control device according to claim 21, wherein the processor is configured to:
  when there is an error in the second information, determine, based on the report message, that the first route policy is related to the error; or
  verify a new route policy based on a report message to which the new route policy is not added and a report message to which the new route policy is added; or
  determine, based on first traffic data in the report message, a route policy used for traffic optimization.

26. The control device according to claim 21, wherein the report message is a network monitoring protocol message, a border gateway protocol monitoring protocol (BMP) message, or a message in a YANG model format.

27. A network system comprising:
  a network device configured to:
    obtain first information and second information corresponding to a route prefix, wherein the first information includes a first route policy for the route prefix, and the second information includes attribute information obtained after processing the route prefix by using the first route policy; and
    generate a route event record entry for the route prefix based on the first information and the second information, wherein the route event record entry comprises the route prefix, the first information, and the second information; and
  a control device configured to:
    obtain the first information and the second information; and
    generate a route event record entry for the route prefix based on the first information and the second information, wherein the route event record entry comprises the route prefix, the first information, and the second information.

* * * * *